UNITED STATES PATENT OFFICE.

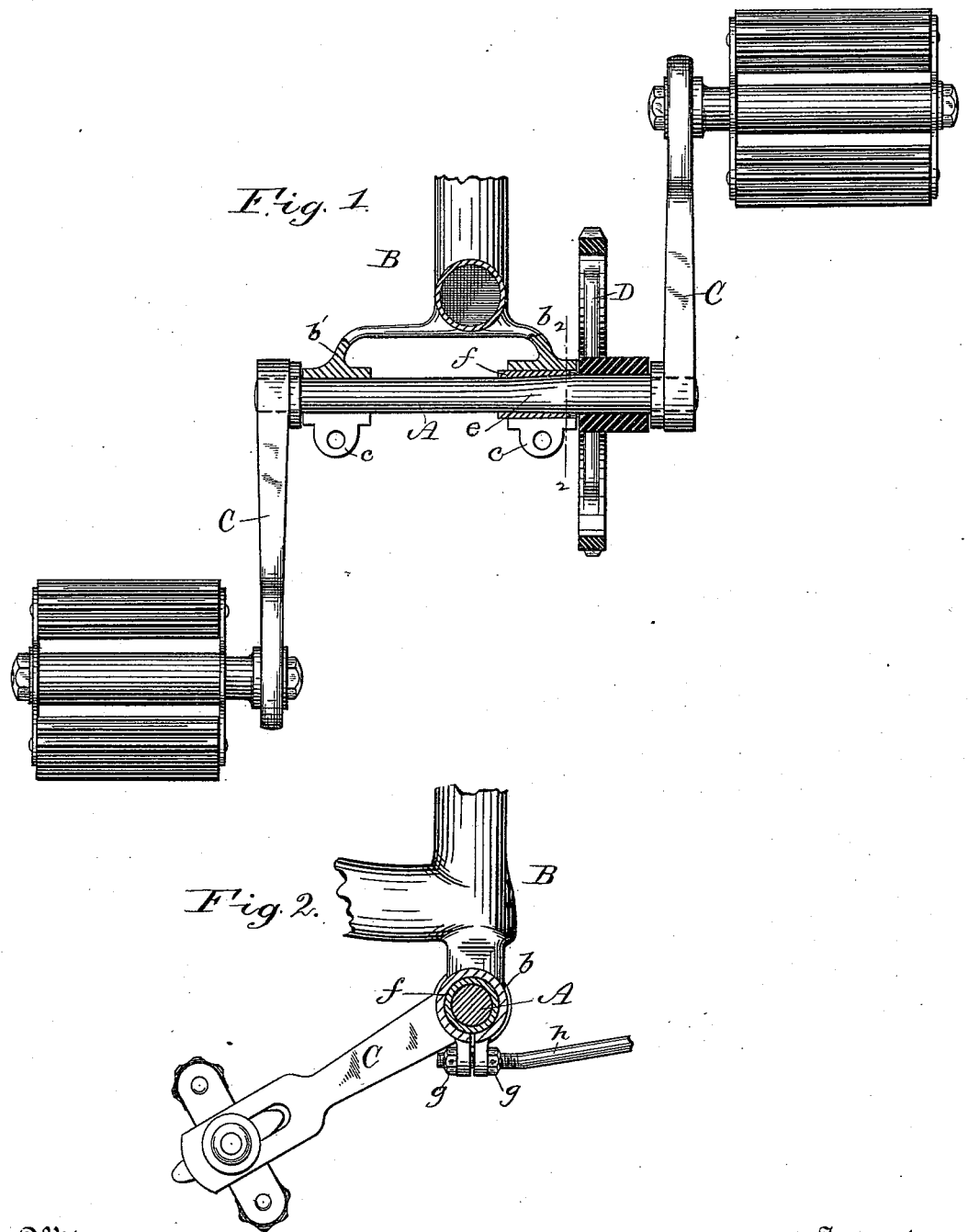

ROBERT S. CRAWFORD, OF WASHINGTON, DISTRICT OF COLUMBIA.

BICYCLE-BEARING.

SPECIFICATION forming part of Letters Patent No. 421,557, dated February 18, 1890.

Application filed November 25, 1889. Serial No. 331,450. (No model.)

*To all whom it may concern:*

Be it known that I, ROBERT S. CRAWFORD, a citizen of the United States, residing at Washington, in the District of Columbia, have invented certain new and useful Improvements in Bicycle-Bearings, of which the following is a specification, reference being had therein to the accompanying drawings.

My invention has for its object to provide an adjustable bearing for the crank-shafts of bicycles, said bearing being of such construction that wear may be taken up or compensated for without moving or adjusting the said shaft. To this end the crank-shaft is formed with a conical or tapering portion adjacent to that part thereof to which the sprocket-wheel is attached, said tapering portion being encircled by an adjustable tapering sleeve secured in place in the bracket which supports the said crank-shaft.

In the accompanying drawings, Figure 1 is a sectional elevation illustrative of my invention; and Fig. 2 is a side view, partly in section, on line 2 2 of Fig. 1.

A denotes the crank-shaft of a bicycle, and B the bracket by which said crank-shaft is supported, and which has arms $b$ $b'$, forming bearings for said shaft, said arms being preferably split, as shown, and having ears $c$ to receive bolts or screws by which the split arms may be compressed. The cranks C and sprocket-wheel D are keyed or secured to the shaft in any suitable manner, and the said shaft has a tapering portion $e$ adjacent to the said sprocket-wheel, said tapering portion being encircled by a sleeve or bushing $f$, the inner surface of which is tapered to conform to the tapering portion of the shaft. The tapering sleeve $f$ is secured in place in the arm $b$ of the bracket, preferably by compressing the split ears $c$ thereof, such compression being effected, in the present instance, by set-nuts $g$ on the threaded portion of a rod $h$, which serves as one of the adjustable stays for the rear wheel-bearing.

From the foregoing it will be apparent that by simply adjusting the sleeve $f$ toward the sprocket-wheel D without changing the position of the crank-shaft, any wear of the said shaft at the bearing afforded by said sleeve may be readily taken up.

As most of the wear of a safety-bicycle crank-shaft occurs at the bearing next to the chain sprocket-wheel, (owing to the draft of the chain,) I do not deem it necessary to provide but one adjustable sleeve, as shown, as the wear in the bearing afforded by the arm $b'$ is so slight that it may be compensated for simply by compressing the ears $c$ thereof; but it will be understood that the crank-shaft may have two tapered portions, and that the two tapered sleeves for use in connection therewith may be provided, if desired.

I claim—

1. In a bicycle, the combination, with a crank-shaft provided with a sprocket-wheel and having a tapered portion adjacent to said wheel, of a tapered sleeve surrounding the said tapered portion of said shaft, and a supporting-bracket for said crank-shaft, having an arm in which said sleeve is adjustably secured.

2. In a bicycle, the combination, with the crank-shaft A, having the tapered portion $e$, of the sprocket-wheel D, secured to said shaft adjacent to said tapered portion, the bracket B, having the split arms $b$ and $b'$, and the tapered sleeve $f$, adjustably secured in said arm $b$, and surrounding said tapered portion $e$ of said shaft.

In testimony whereof I affix my signature in presence of two witnesses.

ROBERT S. CRAWFORD.

Witnesses:
APPLETON P. CLARK,
HENRY CALVER.